(12) United States Patent
Uraki et al.

(10) Patent No.: US 11,220,763 B2
(45) Date of Patent: Jan. 11, 2022

(54) CELLULOSE ACETATE FIBERS, CELLULOSE ACETATE COMPOSITION, AND METHOD FOR PRODUCING SAME

(71) Applicants: NATIONAL UNIVERSITY CORPORATION HOKKAIDO UNIVERSITY, Sapporo (JP); NIPPON PAPER INDUSTRIES CO., LTD., Tokyo (JP); DAICEL CORPORATION, Osaka (JP)

(72) Inventors: Yasumitsu Uraki, Sapporo (JP); Haruo Konno, Tokyo (JP); Shu Shimamoto, Tokyo (JP)

(73) Assignees: NATIONAL UNIVERSITY CORPORATION HOKKAIDO UNIVERSITY, Sapporo (JP); NIPPON PAPER INDUSTRIES CO., LTD., Tokyo (JP); DAICEL CORPORATION, Osaka (JP)

( * ) Notice: Subject to any disclaimer, the term of this patent is extended or adjusted under 35 U.S.C. 154(b) by 215 days.

(21) Appl. No.: 16/083,699

(22) PCT Filed: Mar. 9, 2017

(86) PCT No.: PCT/JP2017/009543
§ 371 (c)(1),
(2) Date: Sep. 10, 2018

(87) PCT Pub. No.: WO2017/155054
PCT Pub. Date: Sep. 14, 2017

(65) Prior Publication Data
US 2019/0127889 A1    May 2, 2019

(30) Foreign Application Priority Data

Mar. 11, 2016 (JP) .............................. JP2016-048235
Jan. 31, 2017 (JP) .............................. JP2017-015300

(51) Int. Cl.
*D01F 2/28* (2006.01)
*C08H 8/00* (2010.01)
(Continued)

(52) U.S. Cl.
CPC ................ *D01F 2/28* (2013.01); *B82Y 30/00* (2013.01); *C08B 3/06* (2013.01); *C08H 8/00* (2013.01);
(Continued)

(58) Field of Classification Search
None
See application file for complete search history.

(56) References Cited

U.S. PATENT DOCUMENTS

2010/0272980 A1    10/2010   Kowata et al.
2012/0328877 A1    12/2012   Shiramizu et al.
(Continued)

FOREIGN PATENT DOCUMENTS

EP          2787105 A1    10/2014
GB           550170    * 12/1942
(Continued)

OTHER PUBLICATIONS

Liu et al. ("Cellulose Acetate Nanofibers with Photochromic Property: Fabrication and Characterization", Materials Letters, vol. 64, Iss. 22, Nov. 30, 2010, pp. 2427-2430). (Year: 2010).*
(Continued)

*Primary Examiner* — Shawn Mckinnon
(74) *Attorney, Agent, or Firm* — Birch, Stewart, Kolasch & Birch, LLP

(57) ABSTRACT

Disclosed herein is cellulose acetate fibers that have an excellent affinity for resins and is capable of reinforcing resins. The cellulose acetate fibers have a cellulose triacetate
(Continued)

I crystal structure and a number-average fiber diameter of 2 nm or more but 400 nm or less.

17 Claims, 6 Drawing Sheets

(51) Int. Cl.

| | | |
|---|---|---|
| *C08L 1/12* | (2006.01) | |
| *C08J 5/04* | (2006.01) | |
| *B82Y 30/00* | (2011.01) | |
| *D06M 13/188* | (2006.01) | |
| *C08B 3/06* | (2006.01) | |

(52) U.S. Cl.
CPC ............... *C08J 5/045* (2013.01); *C08J 5/046* (2013.01); *C08L 1/12* (2013.01); *D06M 13/188* (2013.01)

(56) References Cited

U.S. PATENT DOCUMENTS

| | | |
|---|---|---|
| 2014/0073722 A1 | 3/2014 | Shiramizu et al. |
| 2016/0002461 A1 | 1/2016 | Tsujii et al. |
| 2016/0333500 A1 | 11/2016 | Shimamoto et al. |

FOREIGN PATENT DOCUMENTS

| | | | |
|---|---|---|---|
| JP | 2009-107155 A | | 5/2009 |
| JP | 2011-184816 A | | 9/2011 |
| JP | 4998981 B2 | | 8/2012 |
| JP | 2014-162880 A | | 9/2014 |
| WO | WO 2009/081881 A1 | | 7/2009 |
| WO | WO2009081881 | * | 7/2009 |
| WO | WO 2010/042647 A2 | | 4/2010 |
| WO | WO 2013/031444 A1 | | 3/2013 |
| WO | WO 2015/107565 A1 | | 7/2015 |

OTHER PUBLICATIONS

Kim et al. ("Surface Acetylation of Bacterial Cellulose", Cellulose, 9:361-367, 2002). (Year: 2002).*

Buras et al., "A Preliminary Report on Fully Acetylated Cotton," Textile Research Journal (Mar. 1957), vol. 27, No. 3, pp. 214-222.

Doyle et al., "Structure of Fibrous Cellulose Acetate: X-ray Diffraction, Positron Annihilation and Electron Microscopy Investigations," Journal of Applied Polymer Science (Jan. 1987), vol. 33, Issue 1, pp. 95-106.

Ichiro et al., "Liquid Phase Fibrous Acetylation of Cellulose (IX), Acetylation of Cellulose Fibers without Imbibition Liquid," Sen'i Gakkaishi (1957), vol. 13, No. 7, pp. 434-439, 431 (English concise explanation).

Kobayashi et al., "Investigation of the structure and interaction of cellulose triacetate I crystal using ab initio calculations," Carbohydrate Research (Mar. 31, 2014), vol. 388, pp. 61-66.

Nishino et al., "Elastic Modulus of the Crystalline Regions of Cellulose Triesters," Journal of Polymer Science Part B: Polymer Physics (Mar. 1995), pp. 611-618.

Pethrick, R. A. and A. M. Wilton., "Plasticization of Fibrous Cellulose Acetate: Part I—Synthesis and Characterization," International Journal of Polymeric Materials and Polymeric Biomaterials (2013), vol. 62, Issue 4, pp. 181-189

Roche et al., "Three-Dimensional Crystalline Structure of Cellulose Triacetate II," Macromolecules (1978), vol. 11, No. 1, pp. 86-94.

Sikorski et al., "Crystal Structure of Cellulose Triacetate I," Macromolecules (2004), vol. 37, No. 12, pp. 4547-4553.

Stipanovic et al., "Molecular and crystal structure of cellulose triacetate I: A parallel chain structure," Polymer (1978), vol. 19, No. 1, pp. 3-8.

Sugiyama et al., "Electron Diffraction Study on the Two Crystalline Phases Occurring in Native Cellulose from an Algal Cell Wall," Macromolecules (1991), vol. 24, No. 14, pp. 4168-4175.

Wada et al., "X-Ray Diffraction Study of the Thermal Expansion Behavior of Cellulose Triacetate I," Journal of Polymer Science Part B: Polymer Physics (Jan. 21, 2009), pp. 517-523.

International Search Report issued in PCT/JP2017/009543 (PCT/ISA/210), dated May 30, 2017.

Written Opinion of the International Searching Authority issued in PCT/JP2017/009543 (PCT/ISA/237), dated May 30, 2017.

Extended European Search Report for European Application No. 17763394.8, dated Oct. 9, 2019.

Leszczyńska et al., "Biocomposites of polyamide 4.10 and surface modified microfibrillated cellulose (MFC): influence of processing parameters on structure and thermomechanica properties," Cellulose, vol. 22, 2015. pp. 2551-2569.

Rodionova et al., "Surface chemical modification of microfibrillated cellulose: improvement of barrier properties for packaging applications," Cellulose, vol. 18, 2011, pp. 127-134.

Japanese Office Action for Japanese Application No. 2017-015300, dated Sep. 8, 2020.

Japanese Office Action for Application No. 2017-015300, dated Nov. 24, 2020, with English language machine translation.

Liu, Haiqing et al., "Ultrafine Fibrous Cellulose Membranes from Electrospinning of Cellulose Acetate", Journal of Polymer Science; Part B Polymer Physics, vol. 40, pp. 2119-2129, 2002.

Xuan, Xiaohui et al., "Preparation and alkali treatment of electrospun CA nanofibers", Journal of Textile Research, vol. 34, No. 9, Sep. 2013. pp. 6-11, with English language abstract.

* cited by examiner 100 nm 100 nm 100 nm 100 nm 100 nm

CELLULOSE ACETATE FIBERS, CELLULOSE ACETATE COMPOSITION, AND METHOD FOR PRODUCING SAME

TECHNICAL FIELD

The present invention relates to cellulose acetate fibers, a cellulose acetate composition, and methods for producing the same.

BACKGROUND ART

A natural cellulose fiber is a fiber having, as a minimum unit, a microfibril that is an assembly of single crystal fibers and has a diameter of about 3 nm. A fiber obtained by extracting this microfibril by chemical and physical treatment is a so-called cellulose nanofiber. The cellulose nanofiber is considered to have a strength five times or more that of steel in spite of the fact that its specific gravity is one-fifth of that of steel, and a low linear thermal expansion coefficient of one-fiftieth of that of glass. Therefore, the cellulose nanofibers are expected to be used as reinforcing fibers that are capable of enhancing the strength of another material, such as a resin material, when combined with the resin material. Further, the cellulose nanofibers themselves or a composite material obtained by combining the cellulose nanofibers with another material, such as a resin material, are/is also expected to function as a transparent material. However, the cellulose nanofibers are hydrophilic, and therefore have a poor affinity for hydrophobic nonpolar versatile resins and are inferior in dispersibility in these resins. For this reason, it is considered necessary to perform modification such as modification of the surfaces of the cellulose nanofibers with a hydrophobic substituent (PTL 1 and PTL 2).

As the crystal structures of cellulose, there are a cellulose I crystal structure and a cellulose II crystal structure (Non-PTL 1 and Non-PTL 3). It is known that as the crystal structures of cellulose acetate obtained by modifying cellulose with acetyl groups, there are a cellulose triacetate I crystal structure (CTA I) and a cellulose triacetate II crystal structure (CTA II) (Non-PTL 1 and Non-PTLs 3 to 7). The cellulose triacetate I crystal structure is considered to be a parallel-chain structure similar to that of the cellulose I crystal structure (Non-PTL 4), and the cellulose triacetate II crystal structure is considered to be an antiparallel-chain structure (Non-PTL 3). Further, it is considered that once a cellulose triacetate I crystal structure is converted to a cellulose triacetate II crystal structure, conversion to a cellulose triacetate I crystal structure does not occur (Non-PTL 3).

CITATION LIST

Patent Literature

PTL 1: Japanese Patent No. 4998981
PTL 2: JP-A-2014-162880
PTL 3: WO 2015/107565

Non-Patent Literature

Non-PTL 1: Takashi Nishino et al., Elastic modulus of the crystalline regions of cellulose triesters, Journal of Polymer Science Part B: Polymer Physics, March 1995, pp 611-618
Non-PTL 2: Junji Sugiyama et al., Electron diffraction study on the two crystalline phases occurring in native cellulose from an algal cell wall, Macromolecules, 1991, 24 (14). pp 4168-4175
Non-PTL 3: E. Roche et al., Three-Dimensional Crystalline Structure of Cellulose Triacetate II, Macromolecules, 1978, 11 (1), pp 86-94
Non-PTL 4: Stipanovic A J et al., Molecular and crystal structure of cellulose triacetate I: A parallel chain structure, Polymer, 1978 19 (1), pp 3-8.
Non-PTL 5: Masahisa Wada et al., X-ray diffraction study of the thermal expansion behavior of cellulose triacetate I. Journal of Polymer Science Part B: Polymer Physics, Jan. 21, 2009, pp 517-523
Non-PTL 6: Takanori Kobayashi et al., Investigation of the structure and interaction of cellulose triacetate I crystal using ab initio calculations, Carbohydrate Research, Mar. 31, 2014, Volume 388, pp 61-66
Non-PTL 7: Pawel Sikorski et al., Crystal Structure of Cellulose Triacetate I, Macromolecules, 2004, 37 (12), pp 4547-4553
Non-PTL 8: Sakurada Ichiro et al., Liquid Phase Fibrous Acetylation of Cellulose (IX), Acetylation of Cellulose Fibers without Imbibition Liquid, Sen'i Gakkaishi, Vol. 13 (1957). No. 7, P 434-439, 431
Non-PTL 9: Edmund M. et al., A Preliminary Report on Fully Acetylated Cotton, Textile Research Journal, March 1957, vol. 27, no. 3, pp 214-222
Non-PTL 10: Richard A. Pethrick et al., Plasticization of Fibrous Cellulose Acetate: Part I-Synthesis and Characterization, International Journal of Polymeric Materials and Polymeric Biomaterials, 2013, Volume 62, Issue 4, pp 181-189
Non-PTL 11: Stephen E. Doyle et al., Structure of fibrous cellulose acetate: X-ray diffraction, positron annihilation and electron microscopy investigations, Journal of Applied Polymer Science, January 1987, Volume 33, Issue 1, pp 95-106

SUMMARY OF INVENTION

Technical Problem

The small specific gravity, high strength, and low linear thermal expansion coefficient of a cellulose nanofiber obtained from natural cellulose are considered to result from the fact that the cellulose nanofiber has a cellulose I crystal structure (cellulose I, More precisely, cellulose I is a mixture of cellulose Iα and cellulose Iβ. (Non-PTL 2)) in which all the cellulose molecular chains are oriented in the same direction to form a parallel-chain structure, and further result from the fact that the cellulose nanofiber has a microfibril structure, containing a cellulose I crystal structure, in which about 36 cellulose molecular chains assemble so as to be arranged in parallel.

When natural cellulose is acetylated by a conventional so-called dissolution method in which acetylation is performed using acetic acid, acetic anhydride, and sulfuric acid, only cellulose acetate is obtained which has a cellulose triacetate II crystal structure and does not retain a microfibril structure (Non-PTL 1). Further, as described above, once a cellulose triacetate I crystal structure is converted to a cellulose triacetate II crystal structure, conversion to a cellulose triacetate I crystal structure does not occur. If a whole natural cellulose fiber can be changed to a hydrophobic cellulose derivative while maintaining its cellulose I crystal structure and microfibril structure to form a cellulose acetate fiber having a cellulose triacetate I crystal structure, an affinity for hydrophobic nonpolar versatile resins is improved. Such a cellulose acetate fiber is expected to contribute to reinforcing resins. However, there is no known conventional cellulose acetate fiber (cellulose acetate nanofiber) having a cellulose triacetate type I crystal structure and a fiber diameter of 2 to 400 nm corresponding to I to 100 microfibril fibers (Non-PTLs 4 to 7).

It is an object of the present invention to provide cellulose acetate fibers that have excellent affinity for resins and are capable of reinforcing resins.

Solution to Problem

A first aspect of the present invention relates to cellulose acetate fibers having a cellulose triacetate I crystal structure and a number-average fiber diameter of 2 nm or more but 400 nm or less.

The cellulose acetate fibers preferably have a cellulose triacetate I crystal structure and a number-average fiber diameter of 4 nm or more but 300 nm or less.

The cellulose acetate fibers preferably have a cellulose triacetate I crystal structure and a number-average fiber diameter of 6 nm or more but 100 nm or less.

The cellulose acetate fibers preferably have an average substitution degree of 2.0 or more but 3.0 or less.

The cellulose acetate fibers preferably have a viscosity-average polymerization degree of 50 or more but 1500 or less.

A second aspect of the present invention relates to a cellulose acetate composition including the cellulose acetate fibers.

The cellulose acetate composition preferably further includes a resin.

A third aspect of the present invention relates to a method for producing cellulose acetate fibers, the method including the steps of: (1) acetylating fibrous raw material cellulose by reacting it with acetic anhydride in a solvent containing a poor solvent for cellulose acetate and acetic acid; (2) separating cellulose acetate obtained by the acetylation as a solid; (3) washing the solid; and (4) suspending the solid in water or an organic solvent containing water and fibrillating the solid with a use of a homogenizer.

The method preferably includes, before the step (1) of acetylating fibrous raw material cellulose, the step of pretreating the raw material cellulose by bringing it into contact with water, acetic acid, or water and acetic acid.

The method preferably has the step of melt-kneading a resin in a presence of the cellulose acetate fibers.

Advantageous Effects of Invention

According to the present invention, it is possible to provide cellulose acetate fibers that have excellent affinity for resins and are capable of reinforcing resins.

DESCRIPTION OF EMBODIMENTS

Figure 1:
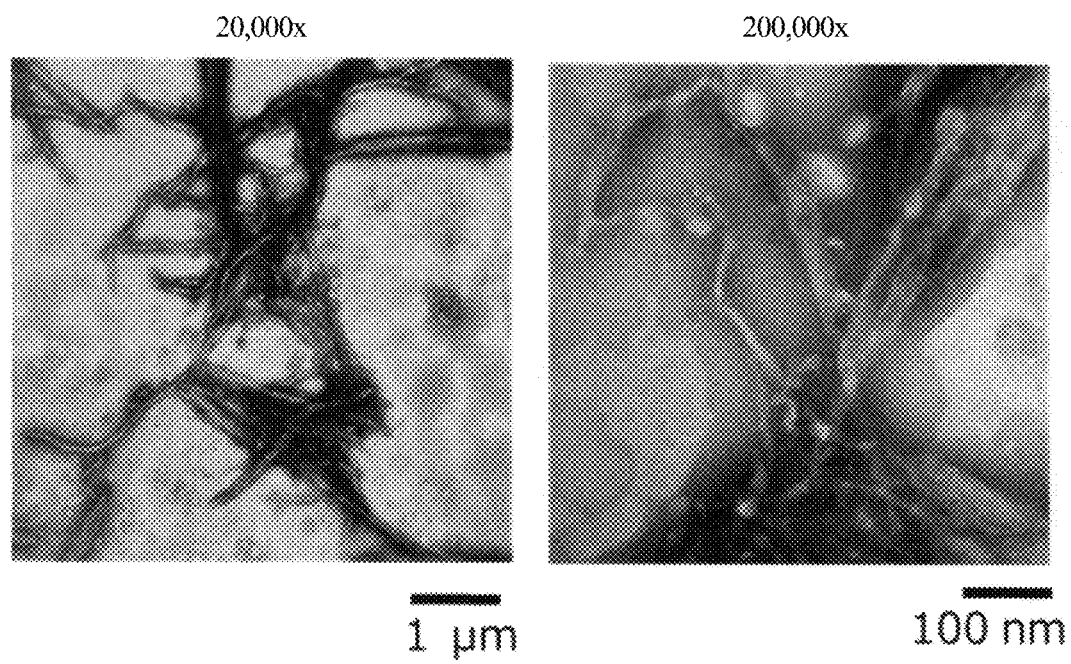
FIG. 1 is a transmission electron micrograph of cellulose acetate fibers.

Hereinbelow, one preferred embodiment according to the present invention will be specifically described.

Cellulose acetate fibers according to the present invention have a cellulose triacetate I crystal structure and a number-average fiber diameter of 2 nm or more but 400 nm or less.

(Cellulose Triacetate I Crystal Structure)

The fact that cellulose acetate fibers have a cellulose triacetate I crystal structure (hereinafter also referred to as CTA I) can be identified by the appearance of typical peaks at two positions around $2\theta=7.6$ to $8.6°$ and $2\theta=15.9$ to $16.9°$ in a diffraction profile obtained from an X-ray diffraction photograph using CuKα ($\lambda=1.542184$ Å).

Similarly, the fact that cellulose acetate fibers have a cellulose triacetate II crystal structure (hereinafter also referred to as CTA II) can be identified by the appearance of typical peaks at three positions around $2\theta=7.9$ to $8.9°$, $2\theta=9.9$ to $10.9°$, and $2\theta=12.6$ to $13.6°$.

As described above, the cellulose acetate fibers according to the present invention have a cellulose triacetate I crystal structure, and therefore can have a small specific gravity and excellent strength. Non-PTL 1 discloses that cellulose fibers having a cellulose I crystal structure have an elastic modulus as high as 134 GPa and that cellulose acetate obtained by treating cellulose with a mixture of anhydrous trifluoroacetic acid and acetic acid has an elastic modulus as low as 33.2 GPa. Non-PTL 1 discloses that a product of a reaction for obtaining cellulose acetate is dissolved in a reaction system, but does not disclose the crystal structure of the cellulose acetate. However, as shown in Non-PTL 3, cellulose acetate obtained by dissolution is considered to have a cellulose triacetate II crystal structure. Non-PTL 9 discloses the measurement results of strength of cellulose acetate fibers obtained by non-uniformly acetylating cotton cellulose fibers as a raw material from beginning to end without dissolving a product in a reaction system (Table III). As can be seen from the results, the cellulose fibers as a raw material have a strength of 1.13 g/denier, and the cellulose acetate fibers have a strength of 1.19 denier, from which it is understood that the strength derived from the cellulose I crystal structure of natural cellulose is generally maintained even when acetylation is performed. Based on the findings of Non-PTL 3 and Non-PTL 4, the cellulose acetate disclosed in Non-PTL 9 is considered to have a cellulose triacetate I crystal structure. From the above, a cellulose triacetate I crystal structure is considered to have excellent strength like a cellulose I crystal structure. However, it is not clear whether cellulose microfibrils with a fiber diameter of about 3 nm which are minimum units constituting a natural cellulose fiber with a fiber diameter of about 20 μm are maintained even after such acetylation as disclosed in Non- PTL 9, and nano-sized fibers having a cellulose triacetate type I crystal structure have not been created and applied for reinforcing resins.

(Number-Average Fiber Diameter)

The cellulose acetate fibers according to the present invention have a number-average fiber diameter of 2 nm or more but 400 nm or less. The number-average fiber diameter is preferably 4 nm or more but 300 nm or less, more preferably 6 nm or more but 100 nm or less. The lower limit of number-average fiber diameter of the cellulose acetate fibers is not particularly limited. However, if the lower limit is less than 2 nm, the ratio of the fibers not having a microfibril structure increases so that the cellulose acetate fibers cannot have the effect of reinforcing resins. If the upper limit of number-average fiber diameter of the cellulose acetate fibers exceeds 400 nm, disintegration of the cellulose acetate fibers is insufficient. Therefore, when a composition containing the fibers is prepared, the fibers are poor in dispersibility in a dispersion medium so that the composition is inferior in uniformity, transparency, and strength.

Here, the number-average fiber diameter of the cellulose acetate fibers is a value calculated from fiber diameters (n≥6) measured on the basis of an electron micrograph.

(Average Substitution Degree)

The average substitution degree of the cellulose acetate fibers according to the present invention is preferably 2.0 or more but 3.0 or less. When the average substitution degree is 2.0 or more but 3.0 or less, the surfaces of cellulose acetate molecules are highly hydrophobic, and therefore the cellulose acetate fibers have an excellent affinity for a hydrophobic resin such as polypropylene. When the cellulose acetate fibers are to be dispersed in a hydrophobic resin such as polypropylene, from the viewpoint of an affinity for the resin, the upper limit of average substitution degree of the cellulose acetate fibers is preferably higher, most preferably 3.0, and the lower limit of average substitution degree of the cellulose acetate fibers is preferably 2.2 or more, more preferably 2.8 or more. When the cellulose acetate fibers are to be dispersed in polyethylene terephthalate or the like, the upper limit of average substitution degree of the cellulose acetate fibers is preferably 3.0 or less, more preferably 2.9 or less, and the lower limit of average substitution degree of the cellulose acetate fibers is preferably 2.0 or more, more preferably 2.2 or more.

The average substitution degree of the cellulose acetate fibers can be measured by a known titration method in which cellulose acetate is dissolved in water and the substitution degree of the cellulose acetate is determined. For example, the following method can be used. The acetylation degree of cellulose acetate is determined according to a method for measuring acetylation degree specified in ASTM:D-817-91 (test methods for cellulose acetate etc.) and converted to average substitution degree by the following formula. This is the most common method for determining the average substitution degree of cellulose acetate.

Average substitution degree (DS)=162.14×acetylation degree (%)/{6005.2−42.037×acetylation degree (%)}

First, 1.9 g of dried cellulose acetate (sample) is precisely weighed and dissolved in 150 ml of a mixed solution of acetone and dimethylsulfoxide (volume ratio 4:1), and then 30 ml of a 1N aqueous sodium hydroxide solution was added to saponify the cellulose acetate at 25° C. for 2 hours. Phenolphthalein is added as an indicator, and the excess sodium hydroxide is titrated with 1N-sulfuric acid (concentration factor: F). Further, a blank test is performed in the same manner, and the acetylation degree of the sample is calculated by the following formula:

Acetylation degree (%)={6.5×(B−A)×F}/W (wherein A is a titer (ml) of 1N-sulfuric acid used for the sample, B is a titer (ml) of 1N-sulfuric acid used in the blank test, F is a concentration factor of 1N-sulfuric acid, and W is a weight of the sample).

(Viscosity-Average Polymerization Degree)

The viscosity-average polymerization degree of the cellulose acetate fibers according to the present invention is preferably 50 or more but 2,500 or less, more preferably 400 or more but 2,000 or less, even more preferably 1,000 or more but 1,500 or less. If the viscosity-average polymerization degree is less than 50, the cellulose acetate fibers tend to have poor strength. If the viscosity-average polymerization degree exceeds 2,500, it is difficult to perform fibrillation to allow the cellulose acetate fibers according to the present invention to have a desired number-average fiber diameter.

The viscosity-average polymerization degree (DP) can be determined by a method described by Kamide et al. in Polym J., 11, 523-538 (1979). The method will be described below.

Cellulose acetate is dissolved in dimethylacetamide (DMAc) to prepare a solution having a concentration of 0.002 g/mL. Then, the specific viscosity ($\eta_{rel}$, unit: mL/g) of this solution is determined at 25° C. by an ordinary method using an Ostwald viscometer. More specifically, the Ostwald viscometer is one whose time of flow in a blank test is 90 seconds to 210 seconds, the temperature of the solution to be measured is regulated in a thermostatic bath at 25±0.2° C. for 120 minutes or more, 10 ml of the solution is introduced into the Ostwald viscometer using a transfer pipette, and the time of flow of the solution is measured twice or more to determine an average as a measurement result. The measurement result is divided by the time of flow of a blank measured in the same manner to determine a specific viscosity. The natural logarithm of the thus determined specific viscosity (natural logarithmic specific viscosity) is divided by the concentration (unit: g/ml) to approximately determine an intrinsic-viscosity number ([$\eta$], unit: ml/g).

$$\eta_{rel}=T/T_0$$

$$[\eta]=(ln\eta_{rel})/C$$

(wherein T is a falling time (in seconds) of a measurement sample, To is a falling time (in seconds) of a solvent, and C is a concentration (g/ml))

A viscosity-average molecular weight can be determined by the following formula.

Viscosity-average molecular weight=$([\eta]/K_m)^{1/\alpha}$

Here, $K_m$ and $\alpha$ are constants. In the case of cellulose triacetate, $K_m$ is 0.0264 and $\alpha$ is 0.750.

The viscosity-average polymerization degree can be determined by the following formula.

Viscosity-average polymerization degree=viscosity-average molecular weight/(162.14+42.037×average substitution degree (DS))

[Cellulose Acetate Composition]

A cellulose acetate composition according to the present invention contains the cellulose acetate fibers according to the present invention. The cellulose acetate composition according to the present invention is not particularly limited as long as the cellulose acetate fibers according to the present invention are contained. Examples of the cellulose acetate composition include a liquid dispersion or a solid dispersion obtained by dispersing the cellulose acetate fibers according to the present invention in any liquid (liquid phase) or solid (solid phase) dispersion medium and a composite material obtained by adding the cellulose acetate fibers according to the present invention to a matrix.

The liquid (liquid phase) or solid (solid phase) dispersion medium or the matrix to be used for the cellulose acetate composition according to the present invention is not particularly limited as long as the cellulose acetate fibers according to the present invention can be dispersed therein, and examples thereof include resins, especially fine particulate resins such as nylon resin fine particles, organic solvents, oil paints, and aqueous paints.

The resin used as a dispersion medium or matrix for the cellulose acetate composition according to the present invention may be any one of a monomer, an oligomer, and a polymer. When the resin is a polymer, the polymer may be either a thermoplastic resin or a thermosetting resin.

Specific examples of the thermoplastic resin include polyethylene resins, polypropylene resins, polystyrene resins, rubber-modified polystyrene resins, acrylonitrile-butadiene-styrene (ABS) resins, acrylonitrile-styrene (AS) resins, polymethyl methacrylate resins, acrylic resins, polyvinyl chloride resins, polyvinylidene chloride resins, polyethylene terephthalate resins, ethylene vinyl alcohol resins, cellulose acetate resins, ionomer resins, polyacrylonitrile resins, polyamide resins such as nylon, polyacetal resins, polybutylene terephthalate resins, polylactic acid resins, polyphenylene ether resins, modified polyphenylene ether resins, polycarbonate resins, polysulfone resins, polyphenylene sulfide resins, polyether imide resins, polyether sulfone resins, polyarylate resins, thermoplastic polyimide resins, polyamideimide resins, polyether ether ketone resins, polyketone resins, fluorine resins, syndiotactic polystyrene resins, and cyclic polyolefin resins. These thermoplastic resins may be used singly or in combination of two or more of them. The thermoplastic resin may be used as a molten liquid phase or a solid phase such as fine particles.

Specific examples of the thermosetting resin include phenol resins, urea resins, melamine resins, benzoguanamine resins, alkyd resins, unsaturated polyester resins, vinyl ester resins, diallyl(tere)phthalate resins, epoxy resins, silicone resins, urethane resins, furan resins, ketone resins, xylene resins, and thermosetting polyimide resins. These thermosetting resins may be used singly or in combination of two or more of them. When the main component of the resin used in the present invention is a thermoplastic resin, a small amount of a thermosetting resin may be added without impairing the properties of the thermoplastic resin. On the other hand, when the main component of the resin used in the present invention is a thermosetting resin, a small amount of a thermoplastic resin or a monomer such as an acrylic monomer or a styrene monomer may be added without impairing the properties of the thermosetting resin.

The cellulose acetate fibers according to the present invention have excellent hydrophobicity, and are therefore excellent in dispersibility in the above-mentioned resins, especially in the above-mentioned hydrophobic resins, which makes it possible to obtain a uniform composite material or dispersion having high strength.

Examples of the organic solvent include, but are not limited to, alcohols such as methanol, propanol, and ethanol; and aromatic hydrocarbons such as benzene, toluene, and xylene. These organic solvents may be used singly or in combination of two or more of them.

[Production of Cellulose Acetate Fibers]

A method for producing the cellulose acetate fibers according to the present invention will be described in detail. The cellulose acetate fibers according to the present invention can be produced by a method including the steps of: (1) acetylating fibrous raw material cellulose by reacting it with acetic anhydride in a solvent containing a poor solvent for cellulose acetate and acetic acid; (2) separating cellulose acetate obtained by the acetylation as a solid; (3) washing the solid; and (4) suspending the solid in water or an organic solvent containing water and fibrillating the solid with the use of a homogenizer. It is to be noted that a conventional cellulose acetate fiber production method can be found in Japanese Patent No. 5543118 and "Wood Chemistry" (first volume) (Migita et al., published by KYORITSU SHUPPAN CO., LTD. in 1968, pp. 180 to 190). Cellulose acetate fibers obtained by a homogenous method (i.e., a dissolution method) described in "Wood Chemistry" (first volume) mentioned above are fibers obtained by dry spinning a solution of cellulose acetate. Therefore, when the cellulose acetate has a crystal structure, the obtained fibers have a cellulose triacetate II crystal structure and, as described above, cannot be expected to have a high elastic modulus. Further, there is no known method for allowing cellulose acetate fibers prepared by such a method to have a cellulose triacetate I crystal structure. Further, cellulose acetate fibers prepared by such a method. i.e., by conventional dry spinning have a fiber diameter of several tens of micrometers. PTL 3 discloses a technique for obtaining fibers having a diameter of 100 nm by electrospinning, but unlike the cellulose acetate fibers according to the present invention, the fibers do not have a cellulose triacetate I crystal structure.

(Raw Material Cellulose)

As raw material cellulose for the cellulose acetate fibers according to the present invention, a fibrous material such as wood pulp or cotton linters can be used, and particularly, a fibrous material having a cellulose I crystal structure can be used. These materials as raw material cellulose may be used singly or in combination of two or more of them.

Cotton linters will be described. Linter pulp has a high cellulose purity and contains less colored components. Therefore, linter pulp is preferred because a composition containing resulting cellulose acetate fibers and a resin or the like has high transparency.

Wood pulp will be described. Wood pulp is preferred because wood pulp can be stably supplied as a raw material and has a cost advantage over cotton linters.

Examples of the wood pulp include softwood pulp and hardwood pulp, and specific examples of the softwood pulp and the hardwood pulp include softwood bleached kraft pulp, hardwood bleached kraft pulp, softwood prehydrolyzed kraft pulp, hardwood prehydrolyzed kraft pulp, hardwood sulfite pulp, and softwood sulfite pulp. As will be described later, wood pulp can be disintegrated into fluff and used as disintegrated pulp. The disintegration can be performed using, for example, a disc refiner.

When the cellulose acetate fibers according to the present invention is allowed to function as a transparent material, the α-cellulose content of the raw material cellulose is preferably 90 wt % or more in consideration of reducing the amount an insoluble residue to prevent a reduction in the transparency of the composition.

The α-cellulose content can be determined in the following manner. Pulp having a known weight is continuously subjected to extraction at 25° C. using a 17.5% aqueous sodium hydroxide solution and a 9.45% aqueous sodium hydroxide solution, and then a fraction soluble in the extraction solution is oxidized with potassium bichromate. The weight of β,γ-cellulose is determined from the volume of potassium bichromate used for oxidization. A value obtained by subtracting the weight of β,γ-cellulose from the initial weight of the pulp is defined as the weight of insoluble portion of the pulp, that is, the weight of n-cellulose (TAPPI T203). The ratio of the weight of insoluble portion of the pulp to the initial weight of the pulp is defined as the α-cellulose content (wt %).

(Disintegration)

The method for producing the cellulose acetate fibers according to the present invention preferably includes the step of disintegrating raw material cellulose (hereinafter also referred to as a disintegration step). This makes it possible to uniformly perform an acetylation reaction in a short time. The disintegration step is particularly effective when wood pulp or the like is supplied in the form of sheets.

In the disintegration step, raw material cellulose is disintegrated by a wet disintegration method or a dry disintegration method. The wet disintegration method is a method in which water or water vapor is added to wood pulp such as pulp sheets to disintegrate the wood pulp. Examples of the wet disintegration method include: a method in which activation by water vapor and high-shear stirring in a reactor are performed; and a method in which disintegration is performed in a dilute aqueous acetic acid solution to obtain a slurry, and then the slurry is repeatedly subjected to dehydration and acetic acid substitution, that is, so-called slurry pretreatment is performed. The dry disintegration method is a method in which wood pulp, such as pulp sheets, is directly disintegrated in a dry state. Examples of the dry disintegration method include: a method in which pulp is roughly disintegrated by a disc refiner having pyramid teeth and then finely disintegrated by a disc refiner having linear teeth; and a method in which a turbo mill is used which includes a cylindrical outer case having a liner attached to its inner wall, a plurality of discs that rotate at a high speed about the center line of the outer case, and a large number of blades radially attached around the center line in such a manner that each of the blades is located between the discs, and an object to be disintegrated is supplied into the outer case and disintegrated by three kinds of impact actions caused by hitting by the blades, collision with the liner, and high-frequency pressure oscillation generated by the action of the high-speed rotating discs, the blades, and the liner.

The method for producing the cellulose acetate according to the present invention can appropriately use any one of these disintegration methods. However, the wet disintegration method is particularly preferred because the acetylation reaction can be completed in a short time and cellulose acetate having a high polymerization degree can be obtained.

(Pretreatment)

The method for producing the cellulose acetate fibers according to the present invention preferably includes a pretreatment step in which disintegrated or non-disintegrated fibrous raw material cellulose is brought into contact with water, acetic acid, or water and acetic acid. The raw material cellulose may be brought into contact with water and acetic acid or may be brought into contact with only acetic acid without using water. At this time, the acetic acid used may be 1 to 100 wt % aqueous acetic acid. Water, acetic acid, or water and acetic acid can be brought into contact with raw material cellulose by, for example, adding preferably 10 to 3000 parts by weight of water, acetic acid, or water and acetic acid per 100 parts by weight of raw material cellulose.

Examples of a method for bringing raw material cellulose into contact with acetic acid include a method in which raw material cellulose is brought into direct contact with acetic acid and a method in which raw material cellulose is brought into contact with water to prepare a water-containing wet cake and acetic acid is added to the wet cake.

Examples of the method in which raw material cellulose is brought into direct contact with acetic acid include: a method in which acetic acid or acetic acid containing 1 to 10 wt % of sulfuric acid (sulfuric acid-containing acetic acid) is added in one step; and a method in which acetic acid or sulfuric acid-containing acetic acid is added in two or more separate steps such as a method in which acetic acid is first added and then sulfuric acid-containing acetic acid is added after a certain period of time or a method in which sulfuric acid-containing acetic acid is first added and then acetic acid is added after a certain period of time. More specifically, acetic acid and/or sulfuric acid-containing acetic acid may be added by spraying it or them onto raw material cellulose and mixing the raw material cellulose.

After acetic acid and/or sulfuric acid-containing acetic acid is/are added to raw material cellulose, the raw material cellulose can be pretreated and activated by allowing it to stand at 17 to 40° C. for 0.2 to 48 hours or by hermetically sealing and stirring it at 17 to 40° C. for 0.1 to 24 hours.

The case where a wet cake of raw material cellulose is prepared before the raw material cellulose is brought into contact with acetic acid will be described. Here, raw material cellulose in the form of a wet cake is simply referred to as a wet cake. The wet cake can be produced by adding water to raw material cellulose, stirring the mixture, and separating the water by filtration. The raw material cellulose can be pretreated by repeating the operation of adding acetic acid to the wet cake, stirring the mixture, and separating the acetic acid by filtration several times, for example, about three times. The solid content concentration of the wet cake just after separating water or acetic acid by filtration is preferably 5 to 50 wt %.

When a wet cake of raw material cellulose is prepared, the raw material cellulose is preferably softwood bleached kraft pulp. This is because fibers having a relatively high polymerization degree and excellent strength can easily be obtained.

Here, the solid content concentration of a wet cake can be determined in the following manner. About 10 g of part of a wet cake (sample) is weighed on an aluminum tray (W2), dried in a vacuum dryer at 60° C. for 3 hours, cooled in a desiccator to room temperature, and weighed (W3) to determine the solid content concentration of the sample according to the following formula:

$$\text{Solid content concentration (\%)} = (W3-W1)/(W2-W1) \times 100$$

wherein W1 is a weight (g) of the aluminum tray, W2 is a weight (g) of the aluminum tray containing a sample before drying, and W3 is a weight (g) of the aluminum tray containing a dried sample.

When a wet cake of raw material cellulose is brought into contact with acetic acid, acetylation can be performed at a relatively low temperature in a relatively short time in an acetylation step that will be described later, which makes it easy to control temperature conditions and time conditions, makes it easy to handle raw material cellulose, and makes it possible to enhance the production efficiency of cellulose acetate fibers.

(Acetylation)

The method for producing the cellulose acetate fibers according to the present invention includes the step (1) of acetylating fibrous raw material cellulose by reacting it with acetic anhydride in a solvent containing a poor solvent for cellulose acetate and acetic acid (hereinafter also referred to as an acetylation step). In the acetylation step, the raw material cellulose includes raw material cellulose that has been subjected to the disintegration step and the pretreatment step and raw material cellulose that has not been subjected to these steps.

More specifically, acetylation can be initiated by, for example, i) adding a poor solvent for cellulose acetate, acetic acid, acetic anhydride, and sulfuric acid in order to fibrous raw material cellulose. The order of addition may be different. Alternatively, acetylation may be initiated by ii) adding fibrous raw material cellulose to a mixture of a poor solvent for cellulose acetate, acetic acid, acetic anhydride, and sulfuric acid or iii) adding a previously-prepared mixture, such as a mixture of acetic acid, a poor solvent for cellulose acetate, and acetic anhydride, and sulfuric acid to fibrous raw material cellulose. The acetic acid used here is preferably one having a concentration of 99 wt % or more. The sulfuric acid used here is preferably one having a concentration of 98 wt % or more, that is, concentrated sulfuric acid. Instead of concentrated sulfuric acid, a catalyst known as a catalyst for acetylation of cellulose can be used in the acetylation step, and examples of such a catalyst include: a strong acid such as perchloric acid, trifluoroacetic acid, methanesulfonic acid, and trifluoromethanesulfonic acid; and salts such as zinc chloride.

By using a poor solvent for cellulose acetate, acetylation can be performed without breaking the microfibril structure of the fibrous raw material cellulose. If the poor solvent is not used, produced cellulose acetate is dissolved in acetic acid used as a diluent in the acetylation reaction so that the microfibril structure of the raw material cellulose is broken.

Needless to say, the poor solvent for cellulose acetate does not dissolve or hardly dissolves cellulose acetate. In addition to that, the poor solvent for cellulose acetate preferably well dissolves acetic anhydride. Examples of such a poor solvent for cellulose acetate include: aromatic hydrocarbons such as benzene, toluene, and xylene; aliphatic hydrocarbons such as cyclohexane and hexane; esters such as amyl acetate; and mixed solvents of two or more of them.

Among them, toluene and cyclohexane are preferred, and benzene is more preferred because the number of steps for separating and collecting waste liquid can be reduced or energy required for collection can be reduced.

The ratio between raw material cellulose used in the acetylation step and acetic acid, a poor solvent for cellulose acetate, and acetic anhydride will be described on a case-by-case basis.

A case will be described where pretreatment is performed by bringing acetic acid into direct contact with raw material cellulose. The amount of a poor solvent for cellulose acetate is preferably 100 to 5,000 parts by weight, more preferably 1,000 to 2,000 parts by weight per 100 parts by weight of raw material cellulose. The amount of acetic acid is preferably 0 to 2,000 parts by weight, more preferably 50 to 1,000 parts by weight per 100 parts by weight of raw material cellulose. The amount of acetic anhydride is preferably 200 to 1,000 parts by weight, more preferably 300 to 700 parts by weight per 100 parts by weight of raw material cellulose. When sulfuric acid is used as a catalyst, the amount of sulfuric acid is preferably 1 to 30 parts by weight, more preferably 5 to 20 parts by weight per 100 parts by weight of raw material cellulose. When methanesulfonic acid is used as a catalyst, the amount of methanesulfonic acid is preferably 10 to 200 parts by weight, more preferably 30 to 90 parts by weight per 100 parts by weight of raw material cellulose.

A case will be described where raw material cellulose is pretreated with water to prepare a wet cake of the raw material cellulose before the raw material cellulose is brought into contact with acetic acid. When the solid content concentration of the wet cake is 5 to 50 wt %, the amount of acetic acid is preferably 100 to 4.000 parts by weight, more preferably 200 to 3,000 parts by weight, even more preferably 1.000 to 2,000 parts by weight per 100 parts by weight of the wet cake. The amount of a poor solvent for cellulose acetate is preferably 5 to 2,500 parts by weight, more preferably 50 to 1,000 parts by weight per 100 parts by weight of the wet cake. The amount of acetic anhydride is preferably 5 to 1,000 parts by weight, more preferably 10 to 500 parts by weight, even more preferably 15 to 350 parts by weight per 100 parts by weight of the wet cake. When sulfuric acid is used as a catalyst, the amount of sulfuric acid is preferably 0.05 to 15 parts by weight, more preferably 5 to 10 parts by weight per 100 parts by weight of the wet cake. When methanesulfonic acid is used as a catalyst, the amount of methanesulfonic acid is preferably 0.5 to 100 parts by weight, more preferably 1.5 to 45 parts by weight per 100 parts by weight of the wet cake.

The temperature in the reaction system during the acetylation step is preferably 5 to 90° C., more preferably 10 to 75° C. If the temperature in the acetylation reaction system is too high, depolymerization of the raw material cellulose is likely to proceed so that resulting cellulose acetate fibers have low strength due to their too low viscosity-average polymerization degree. On the other hand, if the temperature in the acetylation reaction system is too low, the acetylation reaction does not proceed so that the reaction requires an enormous amount of time or conversion of cellulose to cellulose acetate cannot be performed.

The temperature in the acetylation reaction system can be adjusted by externally applying no heat to the inside and outside of the reaction system under stirring conditions, or by, in addition to that, heating or cooling the reaction system by a heating medium or a cooling medium under stirring conditions so that the reaction system is adjusted to a middle temperature. Alternatively, the temperature in the reaction system may be adjusted by previously heating or cooling acetic acid, a poor solvent for cellulose acetate, acetic anhydride, and sulfuric acid.

The time taken for the acetylation reaction is preferably 0.5 to 20 hours. Here, the time taken for the acetylation reaction refers to the time from when raw material cellulose is brought into contact with a solvent, acetic anhydride, and a catalyst to start the reaction until when a product is separated from a reaction mixture by filtration or the like. However, when chemically-modified pulp, such as TEMPO oxidized pulp, is used as raw material cellulose, the time taken for the acetylation reaction is preferably 0.5 to 60 hours.

In the early stage of the acetylation reaction, the reaction temperature may be 5° C. or lower so that the acetylation reaction is allowed to proceed while the depolymerization reaction is suppressed to reduce the amount of unreacted substances. In this case, the reaction temperature should be increased as slowly as possible, but from the viewpoint of productivity, the reaction temperature is preferably increased in 45 minutes or less, more preferably 30 minutes or less.

The average substitution degree can be adjusted by adjusting the temperature or time of the acetylation reaction or the composition of a reaction bath such as the amount of acetic anhydride or the amount of sulfuric acid. For example, the average substitution degree can be increased by increasing the temperature of the acetylation reaction, prolonging the time of the acetylation reaction, increasing the amount of sulfuric acid, or increasing the amount of acetic anhydride.

(Separation)

Cellulose acetate produced by the acetylation reaction can be separated as a solid from the reaction mixture by filtration.

(Washing)

The method for producing the cellulose acetate fibers according to the present invention includes the step (3) of washing the solid (hereinafter also referred to as a washing step). The washing is not particularly limited as long as acetic acid, acetic anhydride, sulfuric acid, and a sulfate salt can be removed. More specifically, the washing is preferably performed by, for example, separating cellulose acetate obtained as a solid by filtration and then washing the solid with a poor solvent for cellulose acetate, an alcohol, and water in order. When a poor solvent for cellulose acetate, an alcohol, and water are used for washing in this order, the washed wet cake mainly contains water as volatile matter, and therefore the amount of an unnecessary organic solvent remaining in a final product can be reduced. If an alcohol or water is used without using a poor solvent, acetic anhydride remaining in the solid reacts with sulfuric acid, in which case it is necessary to take measures against heat generation. Further, if an alcohol is not used, a poor solvent for cellulose acetate cannot be sufficiently removed from the solid because the poor solvent is not mixed with water.

The poor solvent for cellulose acetate used in the washing step is preferably the same as that used in the acetylation step for the reason that the number of steps can be reduced in the collection and separation of liquid waste.

The alcohol may be any of aliphatic alcohols, alicyclic alcohols, and aromatic alcohols, and may be any of monohydric alcohols, dihydric alcohols, and trihydric or higher polyhydric alcohols. Among these alcohols, ethanol is preferred from the viewpoint of dangerous and hazardous properties of an organic solvent remaining in a final product.

(Drying)

After the washing step (3), the cellulose acetate is preferably dried. A drying method is not particularly limited, and may be a known method such as natural drying, air drying, heat drying, vacuum drying, or freeze drying. Among them, freeze drying is particularly preferred because unnecessary pyrolysis can be avoided.

(Fibrillation)

The method for producing cellulose acetate fibers according to the present invention includes the step (4) of suspending the solid in water or an organic solvent containing water and fibrillating the solid with the use of a homogenizer (hereinafter also referred to as a fibrillation step).

The suspension of the solid in water or an organic solvent containing water will be described. The suspension of cellulose acetate obtained as a solid in water or an organic solvent containing water can be performed by, for example, adding water to cellulose acetate and stirring the mixture with the use of a homodisper at 3000 rpm for 10 to 60 minutes. At this time, the amount of cellulose acetate is preferably 0.1 to 10 wt %, more preferably 0.5 to 5.0 wt % with respect to the amount of water or an organic solvent containing water. In the fibrillation step that will be described later, if the solid content concentration is 0.1 wt % or less, the amount of a liquid to be treated is too large, which reduces industrial production efficiency. On the other hand, if the solid content concentration is 10 wt % or more, there is a case where the fibrillation step does not proceed due to the occurrence of clogging in a fibrillation device.

Examples of the organic solvent used in the fibrillation step include methanol, ethanol, 2-propanol, acetone, tetrahydrofuran, and methyl acetate.

Hereinbelow, fibrillation of the solid will be described. The cellulose acetate suspension prepared in the above manner is subjected to the fibrillation step in the following manner.

A device used for fibrillation is not particularly limited, but is preferably one that can apply a strong shearing force, such as a high-speed rotation device, a colloid mill, a high-pressure device, a roll mill, and an ultrasonic device. Particularly, a wet high- or ultrahigh-pressure homogenizer that can apply a pressure of 50 MPa or more and a strong shearing force to the dispersion liquid is preferably used to efficiently perform fibrillation. The pressure is more preferably 100 MPa or more, even more preferably 140 MPa or more. Prior to fibrillation and dispersion with the use of a high-pressure homogenizer, if necessary, the cellulose acetate may be subjected to pretreatment using a known mixing, stirring, emulsification, or dispersing device such as a high-shear mixer.

Here, when the pressure is 50 MPa or more, resulting cellulose acetate fibers can have a number-average fiber diameter of 400 nm or less, and when the pressure is 100 MPa or more, the number-average fiber diameter can be made smaller.

Here, Non-PTLs 7 to 9 disclose that acetylation is performed in the presence of a poor solvent for cellulose acetate such as amyl acetate, xylene, or toluene, and Non-PTLs 10 and 11 disclose that cellulose acetate obtained by such a method maintains the nano-structure of natural cellulose, but do not show any specific experimental facts supporting it. Further, in Non-Patent Literatures 7 to 11, there is no description about the fibrillation step disclosed in the present invention in which cellulose acetate is suspended in water or an organic solvent containing water and fibrillated using a homogenizer and the microfibril structure.

In the method for producing cellulose acetate fibers according to the present invention, fibrous raw material cellulose is acetylated in a solvent containing a poor solvent for cellulose acetate and then fibrillated using a homogenizer so that resulting cellulose acetate fibers can maintain a microfibril structure that natural cellulose has.

[Production of Cellulose Acetate Composition]

A method for producing the cellulose acetate composition according to the present invention will be described in detail. The cellulose acetate composition according to the present invention can be obtained by, for examples, mixing the cellulose acetate fibers according to the present invention with a matrix or a dispersion medium. A composite material or dispersion using a resin as a matrix or a dispersion medium can be prepared by melt-kneading the resin in the presence of the cellulose acetate fibers. A dispersion liquid in which the cellulose acetate fibers are dispersed in a liquid dispersion medium can be prepared by mixing the cellulose acetate fibers and the dispersion medium and then treating the mixture with a disperser until a dispersion liquid is formed.

The cellulose acetate fibers and the cellulose acetate composition according to the present invention and cellulose acetate fibers and a cellulose acetate composition produced by the production methods according to the present invention can be widely used for, for example, fibers, sanitary products such as paper diapers and menstrual sanitary products, tobacco filters, paints, and cosmetics.

EXAMPLES

Hereinbelow, the present invention will be described more specifically with reference to examples, but the technical scope of the present invention is not limited by these examples. In the following description, "part(s)" refers to "part(s) by weight" unless otherwise specified.

Various physical properties in Examples and Comparative Examples that will be described later were evaluated by the following methods.

<Average Substitution Degree>

Acetylation degree was determined by a method for measuring acetylation degree specified in ASTM:D-817-91 (Test method of cellulose acetate and the like). First. 1.9 g of dried cellulose acetate (sample) was precisely weighed and dissolved in 150 ml of a mixed solvent of acetone and dimethylsulfoxide (volume ratio 4:1), and then 30 ml of a 1N aqueous sodium hydroxide solution was added to saponify the cellulose acetate at 25° C. for 2 hours. Phenolphthalein was added as an indicator, and excess sodium hydroxide was titrated with 1N-sulfuric acid (concentration factor: F). Further, a blank test was performed in the same manner, and acetylation degree was calculated by the following formula:

$$\text{Acetylation degree (\%)} = [6.5 \times (B-A) \times F]/W$$

(wherein A is a titer (ml) of 1N-sulfuric acid used for the sample, B is a titer (ml) of 1N-sulfuric acid used in the blank test, F is a concentration factor of 1N-sulfuric acid, and W is a weight of the sample).

Then, the calculated acetylation degree was converted by the following formula to determine average substitution degree.

$$\text{Average substitution degree (DS)} = 162.14 \times \text{acetylation degree (\%)}/\{6005.2 - 42.037 \times \text{acetylation degree (\%)}\}$$

<Viscosity-Average Polymerization Degree>

Cellulose acetate was dissolved in dimethylacetamide (DMAc) to prepare a solution having a concentration of 0.002 g/ml. Then, the specific viscosity ($\eta_{rel}$, unit: ml/g) of this solution at 25° C. was determined by an ordinary method using an Ostwald viscometer. The natural logarithm of the specific viscosity was divided by the concentration (unit: g/ml) to approximately determine an intrinsic viscosity number ($[\eta]$, unit: ml/g).

$$\eta_{rel} = T/T_0$$

$$[\eta] = (ln\eta_{rel})/C$$

(wherein T is a falling time (in seconds) of a measurement sample, $T_0$ is a falling time (in seconds) of a solvent, and C is a concentration (g/ml))

A viscosity-average molecular weight was determined by the following formula:

$$\text{Viscosity-average molecular weight} = ([\eta]/K_m)^{1/\alpha}$$

wherein $K_m = 0.0264$ and $\alpha = 0.750$.

<X-Ray Diffraction>

A water suspension of cellulose acetate fibers obtained in the fibrillation step was filtered to separate a solid, and the solid was freeze-dried. The solid was subjected to powder X-ray diffraction using an X-ray diffraction measurement device SmartLab manufactured by Rigaku Corporation and a non-reflecting silicon plate.

<Transmission Electron Photomicroscopy>

A water suspension of cellulose acetate fibers obtained in the fibrillation step (concentration: 0.5 wt %) was cast on a hydrophilized carbon film-coated grid, then negatively stained with 2% uranyl acetate, and photographed with a transmission electron microscope (TEM).

<Number-Average Fiber Diameter>

Four straight lines were randomly drawn on a transmission electron microscope image at 200,000-fold magnification. At points where these straight lines and fibers intersected, fiber diameters were measured. The average of the measured fiber diameters was defined as a number-average fiber diameter. It is to be noted that fiber diameters were measured at 6 points or more.

Example 1

First. 100 parts by weight of softwood bleached kraft pulp (NBKP, manufactured by Nippon Paper Industries Co., Ltd.) was pretreated by stirring in 10,000 parts by weight of water at room temperature for 1 hour. Water was separated by filtration to obtain a wet cake having a solid content concentration of about 30% by weight. Then, 10,000 parts by weight of acetic acid was added to the wet cake, and the mixture was stirred at room temperature for 1 hour and filtered to obtain a wet cake having a solid content concentration of about 30%. This operation was repeated three times. In this way, a wet cake of softwood bleached kraft pulp was obtained which was wetted with acetic acid. It is to be noted that the solid content concentration of the wet cake was measured by the above-described method.

Then, 1,620 parts by weight of toluene as a poor solvent for cellulose acetate, 180 parts by weight of acetic acid, 600 parts by weight of acetic anhydride, and 15 parts by weight of concentrated sulfuric acid were added in order to the obtained wet cake of softwood bleached kraft pulp wetted with acetic acid, and the mixture was stirred at 50° C. for 1 hour to obtain a reaction mixture. The reaction mixture was cooled to room temperature and filtered to separate a solid. This solid was washed with 4,000 parts by weight of a poor solvent for cellulose acetate, 4,000 parts by weight of ethanol, and 8,000 parts by weight of water in order and freeze-dried to obtain a product.

Then. 100 parts by weight of the product was suspended in 10,000 parts by weight of water. The dispersed sample was preliminarily fibrillated by EXCEL AUTO HOMOGENIZER (manufactured by NIHONSEIKI KAISHA LTD.), and then finally fibrillated by a high-pressure homogenizer (manufactured by YOSHIDA KIKAI CO., LTD., product name: L-AS) through two-times treatment with a straight nozzle (100 MPa) and three-times treatment with a cross nozzle (140 MPa).

The images of cellulose acetate fibers were taken using a transmission electron microscope at 20,000-fold magnification and 200,000-fold magnification, respectively. The results of photomicroscopy are shown in FIG. 1. According to PTL 1, microfibrils of natural cellulose have a diameter of about 3 nm and a length much larger than 10 times the diameter (axial ratio is much larger than 10). According to Non-PTL 1, the fiber cross-section of two-chain crystal unit cell of natural cellulose has a major axis of 0.817 nm, and according to Non-PTL 3, the fiber cross-section of two-chain crystal unit cell of cellulose triacetate I has a major axis of 2.363 nm. Therefore, when cellulose acetate is obtained while maintaining the microfibril structure of natural cellulose, its fiber diameter should be about 8.68 nm (3×2.363/0.817 nm). As can be seen from the results of photomicroscopy shown in FIG. 1, the product is not amorphous but is a structure, fibers having a diameter of about 10 nm are observed as the structure of a minimum unit, and many of the fibers have an axial ratio larger than 10. From these facts, it can be seen that nanofibers of cellulose acetate (cellulose acetate fibers) retaining a fiber morphology (microfibril structure) were obtained. The number-average fiber diameter was determined on the basis of the transmission electron microscope image at 200,000-fold magnification shown in FIG. 1 and, as a result, found to be 19 nm.

Figure 10:
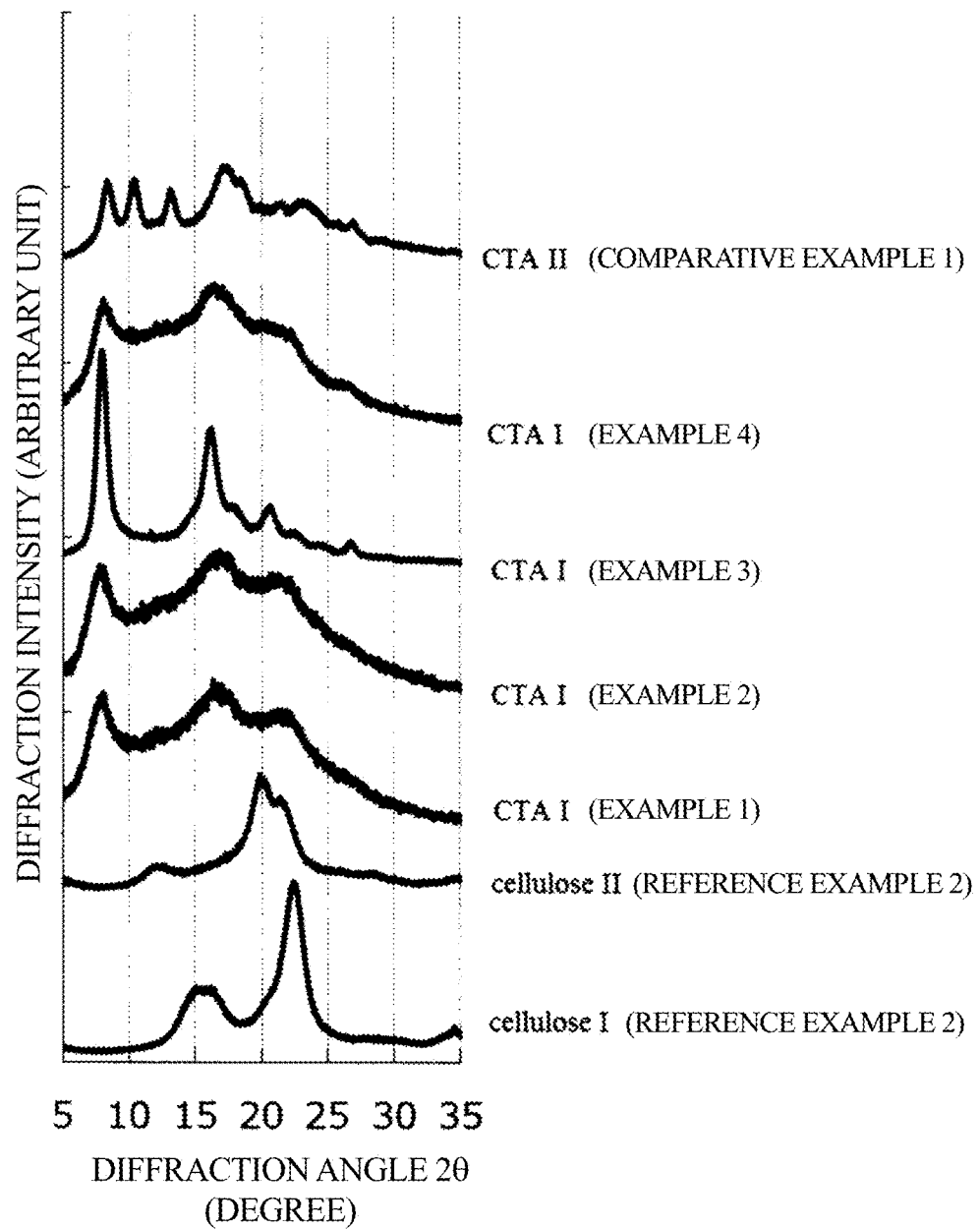
FIG. 10 is a graph showing the results of X-ray diffraction.

The obtained water suspension of cellulose acetate fibers was freeze-dried to obtain a solid sample. The solid sample was subjected to X-ray diffraction, and as a result, typical peaks were observed at two positions around $2\theta=8.0°$ and $2\theta=16.3°$. Therefore, the cellulose acetate fibers were found to have a cellulose triacetate I crystal structure (the result of X-ray diffraction is shown in FIG. 10 together with the results of other Examples). The cellulose acetate fibers had an average substitution degree of 2.9 and a viscosity-average polymerization degree of 80. The results are shown in Table 1.

Example 2

A water suspension of cellulose acetate fibers was obtained by performing an acetylation reaction, separation, washing, and fibrillation in the same manner as in Example 1 except that the softwood bleached kraft pulp (manufactured by Nippon Paper Industries Co., Ltd.) was changed to softwood bleached sulfite pulp (SP manufactured by Nippon Paper Industries Co., Ltd.) and the stirring at 50° C. for 1 hour was changed to stirring at 25° C. for 3 hours.

Figure 2:
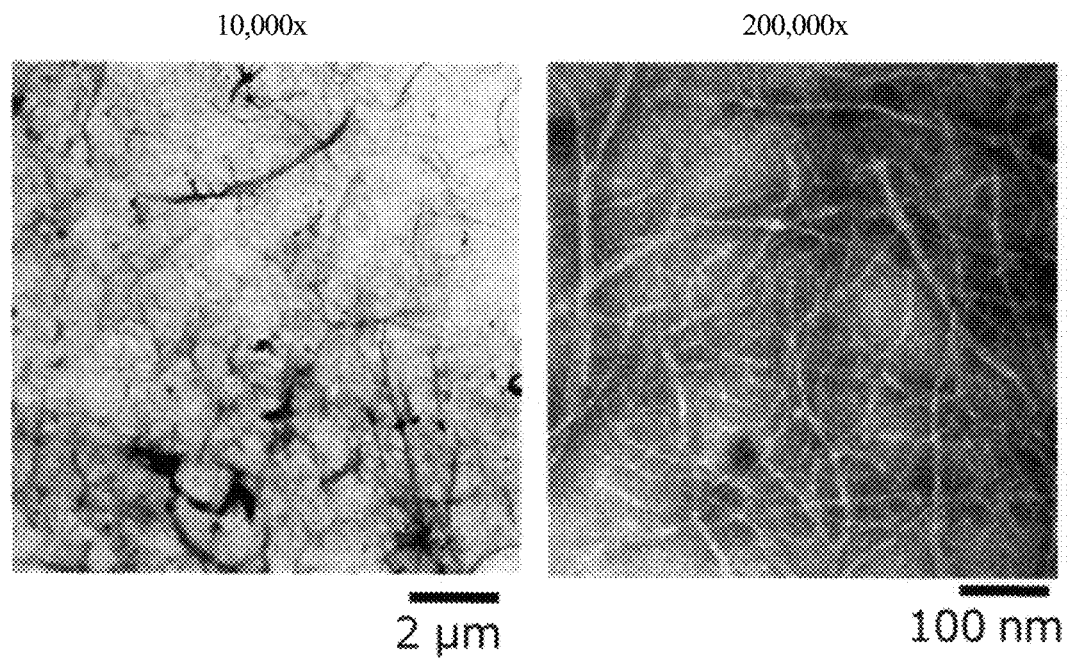
FIG. 2 is a transmission electron micrograph of cellulose acetate fibers.

The images of cellulose acetate fibers were taken using a transmission electron microscope at 10,000-fold magnification and 200,000-fold magnification, respectively. The results of photomicroscopy are shown in FIG. 2. From the results of photomicrography, it can be seen that the product was not amorphous but was a structure, and cellulose acetate (cellulose acetate fibers) retaining a fiber morphology (microfibril structure) was obtained. The number-average fiber diameter was determined on the basis of the transmission electron microscope image at 200,000-fold magnification shown in FIG. 2 and, as a result, found to be 11 nm.

The obtained water suspension of cellulose acetate fibers was freeze-dried to obtain a solid sample. The solid sample was subjected to X-ray diffraction, and as a result, typical peaks were observed at two positions around $2\theta=7.8°$ and $2\theta=16.8°$. Therefore, the cellulose acetate fibers were found to have a cellulose triacetate I crystal structure (the result of X-ray diffraction is shown in FIG. 10 together with the results of other examples. The cellulose acetate fibers had an average substitution degree of 2.8 and a viscosity-average polymerization degree of 686. The results are shown in Table 1.

Example 3

A water suspension of cellulose acetate fibers was obtained by performing an acetylation reaction, separation, washing, and fibrillation in the same manner as in Example 2 except that 1,620 parts by weight of toluene was changed to 1,950 parts by weight of benzene, 180 parts by weight of acetic acid was changed to 276 parts by weight of acetic acid, 600 parts by weight of acetic anhydride was changed to 450 parts by weight of acetic anhydride, 15 parts by weight of sulfuric acid was changed to 90 parts by weight of methanesulfonic acid, and the stirring at 25° C. for 3 hours was changed to stirring at 35° C. for 18 hours.

Figure 3:
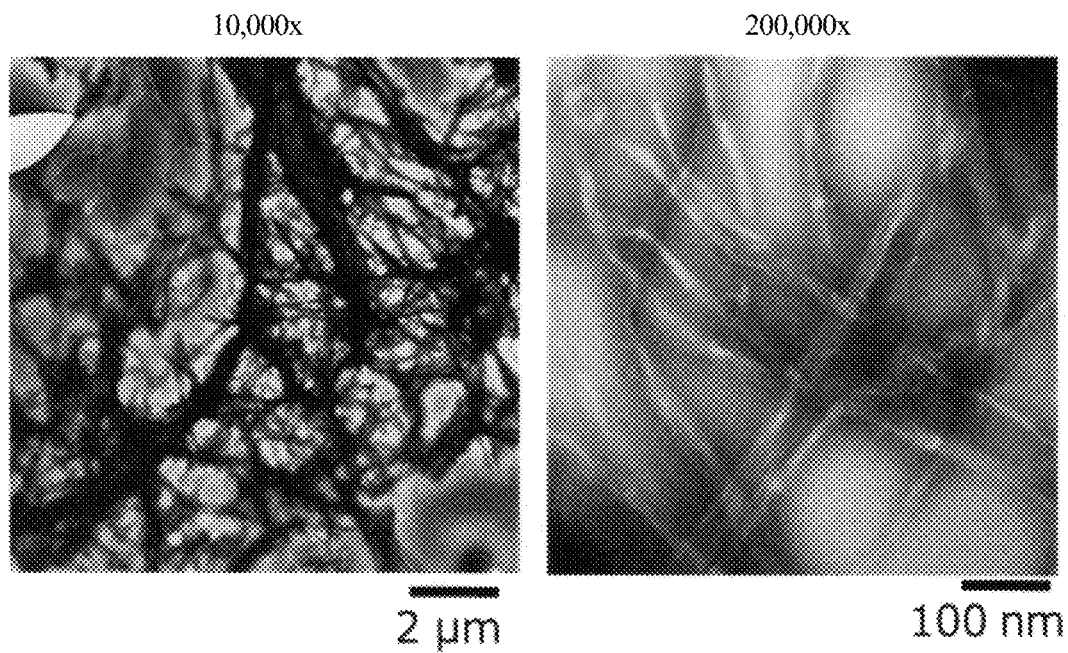
FIG. 3 is a transmission electron micrograph of cellulose acetate fibers.

The images of cellulose acetate fibers were taken using a transmission electron microscope at 10,000-fold magnification and 200,000-fold magnification, respectively. The results of photomicroscopy are shown in FIG. 3. From the results of photomicrography, it can be seen that the product was not amorphous but was a structure, and cellulose acetate (cellulose acetate fibers) retaining a fiber morphology (microfibril structure) was obtained. The number-average fiber diameter was determined on the basis of the transmission electron microscope image at 200,000-fold magnification shown in FIG. 3 and, as a result, found to be 16 nm.

The obtained water suspension of cellulose acetate fibers was freeze-dried and further dried in a nitrogen atmosphere at 230° C. for 15 minutes to obtain a solid sample. The solid sample was subjected to X-ray diffraction, and as a result, typical peaks were observed at two positions around $2\theta=7.9°$ and $2\theta=16.2°$. Therefore, the cellulose acetate fibers were found to have a cellulose triacetate I crystal structure (the result of X-ray diffraction is shown in FIG. 10 together with the results of other examples). The cellulose acetate fibers had an average substitution degree of 2.6 and a viscosity-average polymerization degree of 1,116. The results are shown in Table 1.

Example 4

First, 5.00 g (absolute dry weight) of unrefined softwood bleached kraft pulp (manufactured by Nippon Paper Industries Co., Ltd., whiteness: 85%) was added to 500 mL of an aqueous solution in which 39 mg of TEMPO (manufactured by Sigma Aldrich) (0.05 mmol per gram of absolute dry cellulose) and 514 mg of sodium bromide (1.0 mmol per gram of absolute dry cellulose) were dissolved, and the mixture was stirred until the pulp was uniformly dispersed. An aqueous sodium hypochlorite solution was added to the reaction system so that the concentration of sodium hypochlorite was 5.5 mmol/g to initiate an oxidation reaction at room temperature. Since the pH of the reaction system is reduced during the reaction, a 3M aqueous sodium hydroxide solution was added successively to adjust the pH to 10. The reaction was terminated when sodium hypochlorite was consumed and a change in the pH of the reaction system was stopped. After the reaction, an acid was added to the dispersion liquid to adjust the pH of the dispersion liquid to 3 or less. Then, the mixture after the reaction was filtered through a glass filter to separate the pulp, and the pulp was sufficiently washed with water to obtain oxidized pulp (TEMPO-oxidized pulp, also referred to as TOP). At this time, the yield of the TEMPO-oxidized pulp was 90%, the time taken to complete the oxidation reaction was 90 minutes, and the amount of carboxyl groups was 1.68 mmol/g.

A water suspension of cellulose acetate fibers having carboxyl groups were obtained by performing an acetylation reaction, separation, washing, and fibrillation in the same manner as in Example 3 except that the softwood bleached sulfite pulp was changed to the TEMPO-oxidized pulp and the stirring at 35° C. for 18 hours was changed to stirring at 30° C. for 48 hours.

Figure 4:
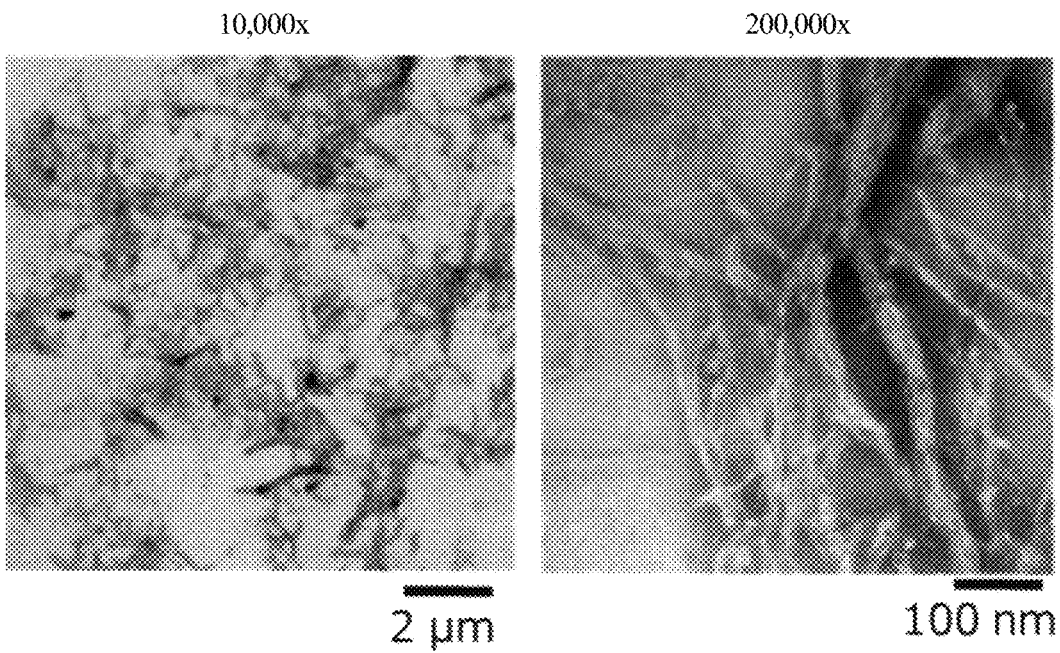
FIG. 4 is a transmission electron micrograph of cellulose acetate fibers.

The images of cellulose acetate fibers were taken using a transmission electron microscope at 10,000-fold magnification and 200,000-fold magnification, respectively. The results of photomicroscopy are shown in FIG. 4. From the results of photomicrography, it can be seen that the product was not amorphous but was a structure, and cellulose acetate (cellulose acetate fibers) retaining a fiber morphology (microfibril structure) was obtained. The number-average fiber diameter was determined on the basis of the transmission electron microscope image at 200,000-fold magnification shown in FIG. 4, and as a result, found to be 23 nm.

The obtained water suspension of cellulose acetate fibers was freeze-dried and further dried in a nitrogen atmosphere at 230° C. for 15 minutes to obtain a solid sample. Typical peaks were observed at two positions around 2θ=8.10 and 2θ=16.4°. Therefore, the cellulose acetate fibers were found to have a cellulose triacetate I crystal structure. The result is shown in FIG. 10. The cellulose acetate fibers had an average substitution degree of 2.7 and a viscosity-average polymerization degree of 471. The results are shown in Table 1.

Example 5

First, 1,800 parts by weight of benzene as a poor solvent for cellulose acetate, 600 parts by weight of acetic anhydride, and 15 parts by weight of concentrated sulfuric acid were added in order to 100 parts by weight of softwood bleached kraft pulp (NBKP, manufactured by Nippon Paper Industries Co., Ltd.), and they were stirred at 75° C. for 8 hours to obtain a reaction mixture. The reaction mixture was cooled to room temperature and filtered to separate a solid. This solid was washed with 4,000 parts by weight of a poor solvent for cellulose acetate, 4,000 parts by weight of ethanol, and 8,000 parts by weight of water in order and freeze-dried to obtain a product.

Then, 100 parts by weight of the product was suspended in 20.000 parts by weight of water. Then, the thus obtained suspension was treated with a homodisper (manufactured by PRIMIX Corporation) at 3,000 rpm for 60 minutes, and then treated with a high-pressure homogenizer (manufactured by YOSHIDA KIKAI CO., LTD., product name: L-AS) to fibrillate the product to obtain a water suspension of cellulose acetate fibers. The treatment with a high-pressure homogenizer (manufactured by YOSHIDA KIKAI CO., LTD., product name: L-AS) was performed under conditions of a pressure of 100 MPa and a number of passes of 3.

Figure 5:
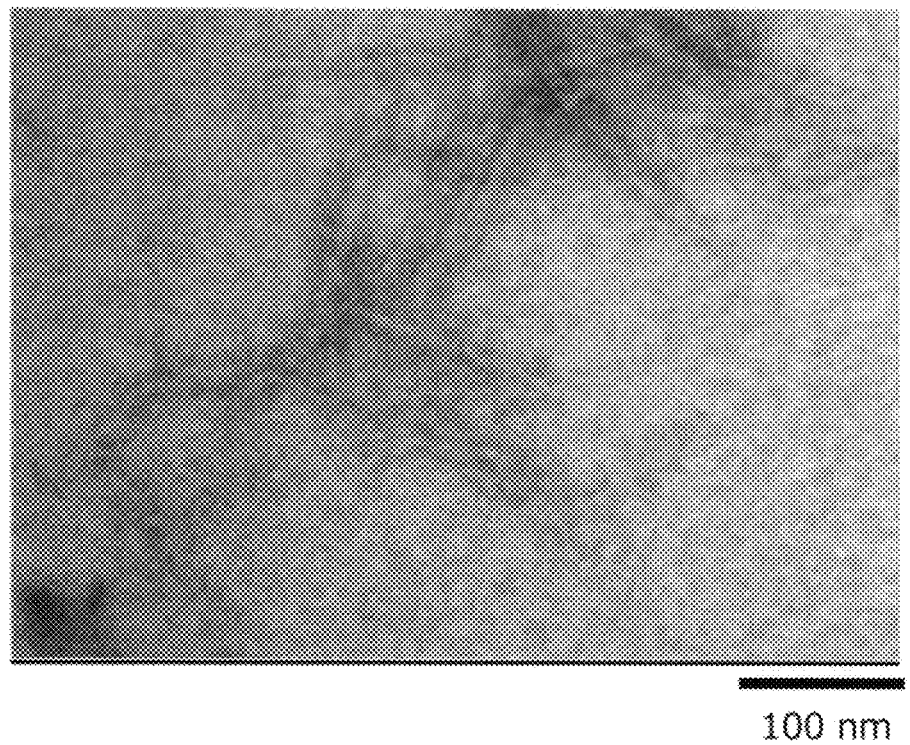
FIG. 5 is a transmission electron micrograph of cellulose acetate fibers.

The image of cellulose acetate fibers was taken using a transmission electron microscope at 200,000-fold magnification. The result of photomicroscopy is shown in FIG. 5. The number-average fiber diameter was determined on the basis of FIG. 5 and, as a result, found to be 12 nm.

The obtained water suspension of cellulose acetate fibers was subjected to X-ray diffraction, and as a result, typical peaks were observed at two positions around 2θ=7.80 and 2θ=16.8°. Therefore, the cellulose acetate fibers were found to have a cellulose triacetate I crystal structure. The cellulose acetate fibers had an average substitution degree of 2.9 and a viscosity-average polymerization degree of 198. The results are shown in Table 1.

Example 6

First, 100 parts by weight of softwood bleached kraft pulp (NBKP, manufactured by Nippon Paper Industries Co., Ltd.) was pretreated by stirring in 10,000 parts by weight of water at room temperature for 1 hour. The water was separated by filtration to obtain a wet cake having a solid content concentration of about 15% by weight. Then, 10,000 parts by weight of acetic acid was added to the wet cake, and the mixture was stirred at room temperature for 1 hour and filtered to obtain a wet cake having a solid content concentration of about 15%. This operation was repeated three times. In this way, a wet cake of softwood bleached kraft pulp was obtained which was wetted with acetic acid. It is to be noted that the solid content concentration of the wet cake was measured by the above-described method.

Then, 1,800 parts by weight of toluene as a poor solvent for cellulose acetate, 200 parts by weight of acetic acid, 600 parts by weight of acetic anhydride, and 15 parts by weight of concentrated sulfuric acid were added in order to the obtained wet cake of softwood bleached kraft pulp wetted with acetic acid, and the mixture was stirred at 50° C. for 1 hour to obtain a reaction mixture. The reaction mixture was cooled to room temperature and filtered to separate a solid. This solid was washed with 4,000 parts by weight of a poor solvent for cellulose acetate, 4,000 parts by weight of ethanol, and 8,000 parts by weight of water in order and freeze-dried to obtain a product.

This product was suspended in water and fibrillated under the same conditions as in Example 5 to obtain a water suspension of cellulose acetate fibers.

Figure 6:
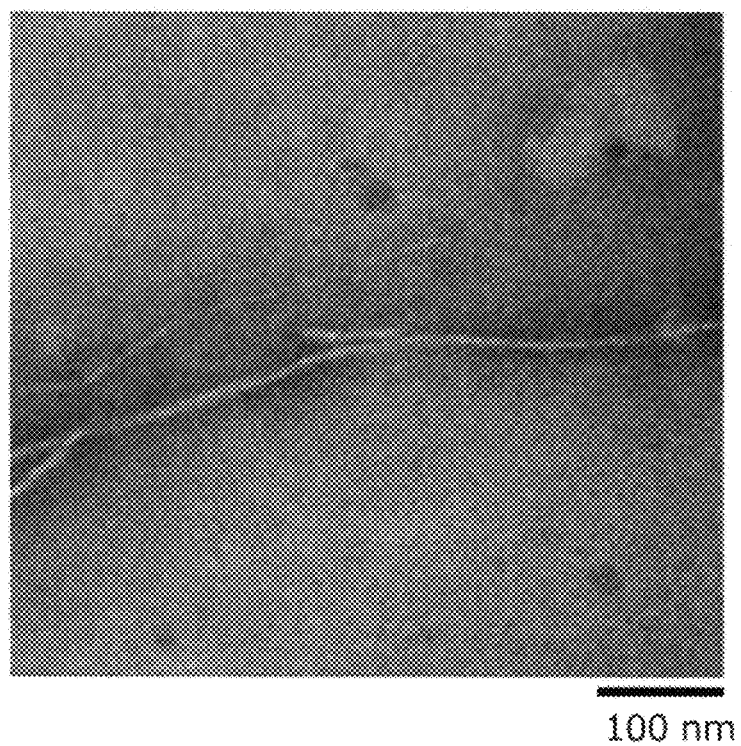
FIG. 6 is a transmission electron micrograph of cellulose acetate fibers.

The image of cellulose acetate fibers was taken using a transmission electron microscope at 200,000-fold magnification. The result of photomicroscopy is shown in FIG. 6. From the results of photomicrography, it can be seen that the product was not amorphous but was a structure, and cellulose acetate (cellulose acetate fibers) retaining a fiber morphology (microfibril structure) was obtained. The number-average fiber diameter was determined on the basis of FIG. 6, and as a result, found to be 10 nm.

The obtained water suspension of cellulose acetate fibers was subjected to X-ray diffraction, and as a result, typical peaks were observed at two positions around 2θ=7.8° and 2θ=16.4°. Therefore, the cellulose acetate fibers were found to have a cellulose triacetate I crystal structure. The cellulose acetate fibers had an average substitution degree of 2.9 and a viscosity-average polymerization degree of 383.

The results are shown in Table 1.

Example 7

First, 100 parts by weight of softwood bleached kraft pulp (NBKP, manufactured by Nippon Paper Industries Co., Ltd.) was pretreated in the same manner as in Example 6.

Then, 1,800 parts by weight of toluene as a poor solvent for cellulose acetate, 200 parts by weight of acetic acid, 600 parts by weight of acetic anhydride, and 15 parts by weight of concentrated sulfuric acid were added in order to the obtained wet cake of softwood bleached kraft pulp wetted with acetic acid, and the mixture was stirred at 25° C. for 8 hours to obtain a reaction mixture. The reaction mixture was cooled to room temperature and filtered to separate a solid. This solid was washed with 4,000 parts by weight of a poor solvent for cellulose acetate, 4,000 parts by weight of ethanol, and 8,000 parts by weight of water in order and freeze-dried to obtain a product.

This product was suspended in water and fibrillated under the same conditions as in Example 5 to obtain a water suspension of cellulose acetate fibers.

Figure 7:
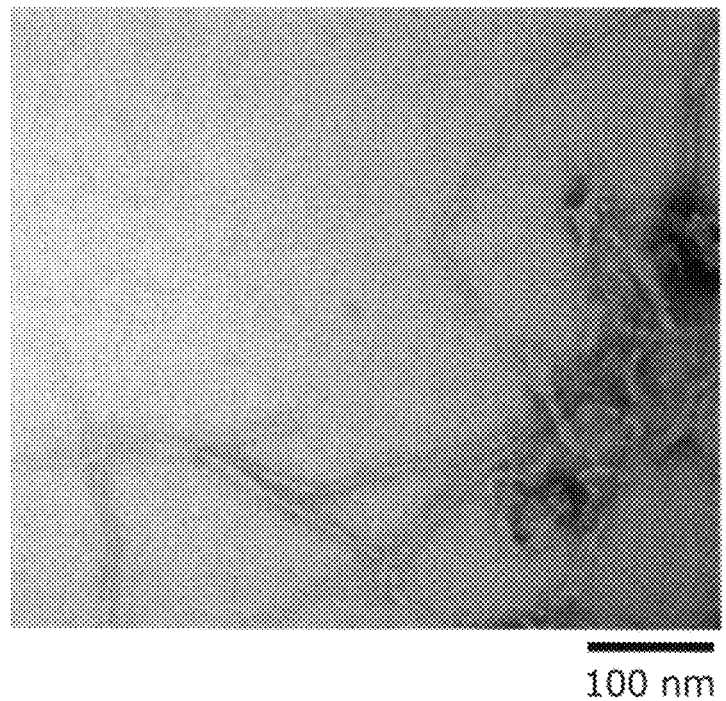
FIG. 7 is a transmission electron micrograph of cellulose acetate fibers.

The image of cellulose acetate fibers was taken using a transmission electron microscope at 200,000-fold magnification. The result of photomicroscopy is shown in FIG. 7. From the results of photomicrography, it can be seen that the product was not amorphous but was a structure, and cellulose acetate (cellulose acetate fibers) retaining a fiber morphology (microfibril structure) was obtained. The number-average fiber diameter was determined on the basis of FIG. 7 and, as a result, found to be 16 nm.

The obtained water suspension of cellulose acetate fibers was subjected to X-ray diffraction, and as a result, typical peaks were observed at two positions around $2\theta=7.8°$ and $2\theta=16.4°$. Therefore, the cellulose acetate fibers were found to have a cellulose triacetate I crystal structure. The average substitution degree of the cellulose acetate fibers was 2.9, and the viscosity-average polymerization degree was 784. The results are shown in Table 1.

Example 8

First, 100 parts by weight of softwood bleached kraft pulp (manufactured by Nippon Paper Industries Co., Ltd.) was pretreated in the same manner as in Example 6.

Then, 1,800 parts by weight of cyclohexane as a poor solvent for cellulose acetate, 200 parts by weight of acetic acid, 600 parts by weight of acetic anhydride, and 15 parts by weight of concentrated sulfuric acid were added in order to the obtained wet cake of softwood bleached kraft pulp wetted with acetic acid, and the mixture was stirred at 15° C. for 16 hours to obtain a reaction mixture. The reaction mixture was cooled to room temperature and filtered to separate a solid. This solid was washed with 4,000 parts by weight of a poor solvent for cellulose acetate, 4,000 parts by weight of ethanol, and 8,000 parts by weight of water in order and freeze-dried to obtain a product.

This product was fibrillated under the same conditions as in Example 5 to obtain a water suspension of cellulose acetate fibers.

Figure 8:
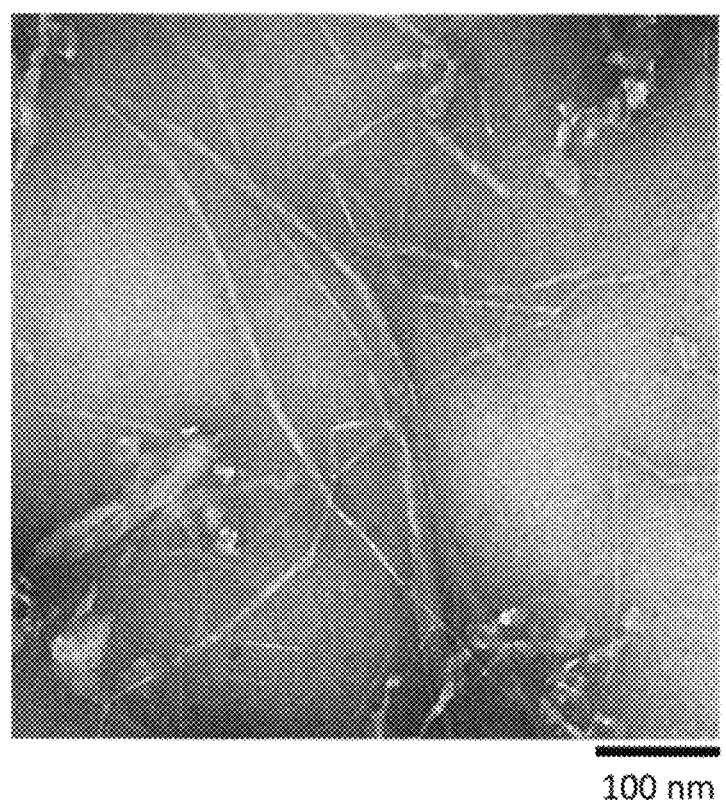
FIG. 8 is a transmission electron micrograph of cellulose acetate fibers.

The image of cellulose acetate fibers was taken using a transmission electron microscope at 200,000-fold magnification. The result of photomicroscopy is shown in FIG. 8. From the results of photomicrography, it can be seen that the product was not amorphous but was a structure, and cellulose acetate (cellulose acetate fibers) retaining a fiber morphology (microfibril structure) was obtained. The number-average fiber diameter was determined on the basis of FIG. 8 and, as a result, found to be 18 nm.

The obtained water suspension of cellulose acetate fibers was subjected to X-ray diffraction, and as a result, typical peaks were observed at two positions around $2\theta=7.8°$ and $2\theta=16.4°$. Therefore, the cellulose acetate fibers were found to have a cellulose triacetate I crystal structure. The result is shown in FIG. 10. The cellulose acetate fibers had an average substitution degree of 2.9 and a viscosity-average polymerization degree of 1,092. The results are shown in Table 1.

Comparative Example 1

First, 51 parts by weight of glacial acetic acid was sprayed onto 100 parts by weight of softwood bleached kraft pulp (manufactured by Nippon Paper Industries Co., Ltd.) to pretreat and activate the pulp. Then, a mixture of 384 parts by weight of glacial acetic acid, 241 parts by weight of acetic anhydride, and 7.7 parts by weight of sulfuric acid was added to and mixed with the pulp by stirring at a temperature of 43° C. or lower to acetylate the pulp. It is to be noted that the time point when fiber pieces disappeared was defined as the end point of the acetylation reaction. Then, at the end of the acetylation reaction, 18.5 parts by weight of a 24 wt % aqueous magnesium acetate solution was added to the reaction system to decompose the excess acetic anhydride and neutralize the sulfuric acid so that the amount of sulfuric acid was reduced to 3.6 parts by weight. Then, water was further added to adjust the ratio of water to acetic acid in the reaction bath to 13 mol %, and the reaction bath was maintained at 65° C. for 30 minutes to perform ripening. Then, 12.6 parts by weight of a 15 wt % aqueous magnesium acetate solution was added over 5 minutes to neutralize the sulfuric acid so that the amount of the sulfuric acid was reduced to 1.8 parts by weight. Then, the reaction bath was further maintained at 65° C. for 10 minutes to perform a second ripening reaction. That is, in the ripening step, neutralization (multistage neutralization) was repeated once. Then, an excess amount of a 15 wt % aqueous magnesium acetate solution was added to completely neutralize the residual sulfuric acid to stop the ripening reaction.

The solution obtained as a reaction solution (dope) of cellulose was mixed with a 10 wt % aqueous acetic acid solution under stirring to obtain a precipitate of cellulose acetate. The obtained precipitate of cellulose acetate was immersed in calcium acetate solutions different in concentration and dehydrated to perform heat resistance treatment (addition of calcium for stabilization). Then, each of the obtained precipitates was separated by filtration, washed with running hot pure water, and dehydrated to obtain cellulose acetate.

Figure 9:
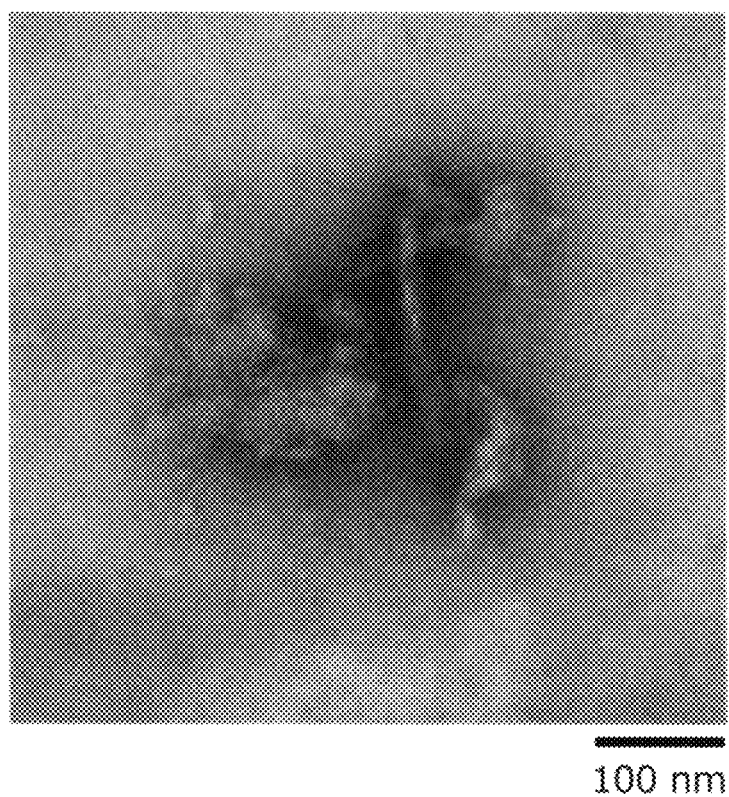
FIG. 9 is a transmission electron micrograph of cellulose acetate.

The image of the cellulose acetate suspended in water was taken using a transmission electron microscope at 200,000-fold magnification. The result of photomicroscopy is shown in FIG. 9. From the result of photomicroscopy, it can be seen that the product is amorphous and does not retain or hardly retains a fiber morphology derived from a microfibril structure.

The obtained water suspension of cellulose acetate was subjected to X-ray diffraction. As a result, typical peaks were observed at three positions around $2\theta=8.4°$, $2\theta=10.4°$, and $2\theta=13.1°$. Therefore, the cellulose acetate was found to have a cellulose triacetate II crystal structure. The result is shown in FIG. 10. The cellulose acetate fibers had an average substitution degree of 2.9 and a viscosity-average polymerization degree of 691. The results are shown in Table 1.

Reference Example 1

Commercially-available microcrystalline cellulose (CEOLUS FD-F20 manufactured by Asahi Kasei Corporation) was subjected to X-ray diffraction. The result is shown in FIG. 10 as Cellulose I. Typical peaks are observed at $2\theta=14.5°$, 15.8°, and 22.3°. This data indicates that the microcrystalline cellulose has a cellulose I crystal structure.

Reference Example 2

Commercially-available cellulose acetate (L-50 manufactured by Daicel Corporation) was deacetylated by stirring in a large excess of a 1N aqueous sodium hydroxide solution at 30° C. for 24 hours and then washed with water and dried to prepare regenerated cellulose. The regenerated cellulose was subjected to X-ray diffraction. The result is shown in FIG. 10 as Cellulose II. Typical peaks are observed at $2\theta=11.6°$, 19.8°, an 20.9°. This data indicates that the regenerated cellulose has a cellulose II crystal structure.

TABLE 1

| | Raw material cellulose (parts by weight) | | Pretreatment | Composition of reaction bath | | | |
|---|---|---|---|---|---|---|---|
| | | | | Poor solvent (parts by weight) | Acetic acid (parts by weight) | Anhydrous acetic acid (parts by weight) | Catalyst (parts by weight) |
| Example 1 | NBKP | 100 | Done | Toluene 1,620 | 180 | 600 | Sulfuric acid |
| Example 2 | SP | 100 | Done | Toluene 1,620 | 180 | 600 | Sulfuric acid |
| Example 3 | SP | 100 | Done | Benzene 1,950 | 276 | 450 | Methanesulfonic acid |
| Example 4 | TOP | 100 | Done | Benzene 1,950 | 276 | 450 | Methanesulfonic acid |
| Example 5 | NBKP | 100 | Not done | Benzene 1,800 | — | 600 | Sulfuric acid |
| Example 6 | NBKP | 100 | Done | Toluene 1,800 | 200 | 600 | Sulfuric acid |
| Example 7 | NBKP | 100 | Done | Toluene 1,800 | 200 | 600 | Sulfuric acid |
| Example 8 | NBKP | 100 | Done | Cyclohexane 1,800 | 200 | 600 | Sulfuric acid |
| Comparative Example 1 | NBKP | 100 | — | — | Glacial acetic acid 384 | 241 | Sulfuric acid |

| | Composition of reaction bath | | | Analysis results after fibrillation | | | X-ray diffraction angle 2θ maximum (°) |
|---|---|---|---|---|---|---|---|
| | Catalyst (parts by weight) | Temperature (° C.) | Time (hrs) | Average substitution degree | Viscosity-average polymerization degree | Number-average fiber diameter (nm) | |
| Example 1 | 15 | 50 | 1 | 2.9 | 80 | 19 | 8.0, 16.3 |
| Example 2 | 15 | 25 | 3 | 2.8 | 686 | 11 | 7.8, 16.8 |
| Example 3 | 90 | 35 | 18 | 2.6 | 1,116 | 16 | 7.9, 16.2 |
| Example 4 | 90 | 30 | 48 | 2.7 | 471 | 23 | 8.1, 16.4 |
| Example 5 | 15 | 75 | 8 | 2.9 | 198 | 12 | 7.8, 16.8 |
| Example 6 | 15 | 50 | 1 | 2.9 | 383 | 10 | 7.8, 16.4 |
| Example 7 | 15 | 25 | 8 | 2.9 | 784 | 16 | 7.8, 16.4 |
| Example 8 | 15 | 15 | 16 | 2.9 | 1,092 | 18 | 7.8, 16.4 |
| Comparative Example 1 | 7.7 | — | — | 2.9 | 691 | Amorphous | 8.4, 10.4, 13.1 |

The invention claimed is:

1. A cellulose acetate fiber comprising:
a cellulose triacetate I crystal structure identified from a diffraction profile obtained by powder X-ray diffraction;
an average substitution degree of 2.0 or more but 3.0 or less;
a number-average fiber diameter of 2 nm or more but 400 nm or less; and
a viscosity-average polymerization degree of 50 or more but 2,500 or less;
wherein the cellulose acetate fiber does not include a cellulose I crystal structure.

2. A cellulose acetate fiber comprising:
a cellulose triacetate I crystal structure identified from a diffraction profile obtained by powder X-ray diffraction;
an average substitution degree of 2.0 or more but 3.0 or less;
a number-average fiber diameter of 4 nm or more but 300 nm or less; and
a viscosity-average polymerization degree of 50 or more but 2,500 or less;
wherein the cellulose acetate fiber does not include a cellulose I crystal structure.

3. A cellulose acetate fiber comprising:
a cellulose triacetate I crystal structure identified from a diffraction profile obtained by powder X-ray diffraction;
an average substitution degree of 2.0 or more but 3.0 or less;
a number-average fiber diameter of 6 nm or more but 100 nm or less; and
a viscosity-average polymerization degree of 50 or more but 2,500 or less;
wherein the cellulose acetate fiber does not include a cellulose I crystal structure.

4. The cellulose acetate fiber according to claim 1, whose viscosity-average polymerization degree is 50 or more but 1,500 or less.

5. A cellulose acetate composition comprising one or more of the cellulose acetate fiber according to claim 1.

6. The cellulose acetate composition according to claim 1, further comprising a resin.

7. The cellulose acetate fiber according to claim 1, wherein the average substitution degree is 2.8 or more but 3.0 or less.

8. The cellulose acetate fiber according to claim 2, wherein the average substitution degree is 2.8 or more but 3.0 or less.

9. The cellulose acetate fiber according to claim 3, wherein the average substitution degree is 2.8 or more but 3.0 or less.

10. The cellulose acetate fiber according to claim 1, wherein the number-average fiber diameter is 2 nm or more but 23 nm or less.

11. The cellulose acetate fiber according to claim 1, wherein the number-average fiber diameter is 4 nm or more but 23 nm or less.

12. The cellulose acetate fiber according to claim 1, wherein the number-average fiber diameter is 6 nm or more but 23 nm or less.

13. The cellulose acetate fiber according to claim 1, whose viscosity-average polymerization degree is 400 or more but 1,500 or less.

14. The cellulose acetate fiber according to claim 1, whose viscosity-average polymerization degree is 1,000 or more but 1,500 or less.

15. The cellulose acetate fiber according to claim 1, wherein the cellulose acetate fiber has peaks at two positions around 2θ=7.6 to 8.6° and 2θ=15.9 to 16.9° in a diffraction profile obtained from an X-ray diffraction photograph using CuKα (λ=1.542184 Å).

16. The cellulose acetate fiber according to claim 2, wherein the cellulose acetate fiber has peaks at two positions around 2θ=7.6 to 8.6° and 2θ=15.9 to 16.9° in a diffraction profile obtained from an X-ray diffraction photograph using CuKα (λ=1.542184 Å).

17. The cellulose acetate fiber according to claim 3, wherein the cellulose acetate fiber has peaks at two positions around 2θ=7.6 to 8.6° and 2θ=15.9 to 16.9° in a diffraction profile obtained from an X-ray diffraction photograph using CuKα (λ=1.542184 Å).

* * * * *